(12) United States Patent
Dore et al.

(10) Patent No.: US 8,619,705 B2
(45) Date of Patent: Dec. 31, 2013

(54) COMMUNICATION METHOD BETWEEN AT LEAST ONE SUBSCRIBER STATION AND AT LEAST TWO BASE STATIONS

(75) Inventors: Renaud Dore, Rennes (FR); Patrick Fontaine, Rennes (FR); Ludovic Jeanne, Rennes (FR)

(73) Assignee: Thomson Licensing (FR)

( * ) Notice: Subject to any disclaimer, the term of this patent is extended or adjusted under 35 U.S.C. 154(b) by 895 days.

(21) Appl. No.: 11/998,964

(22) Filed: Dec. 3, 2007

(65) Prior Publication Data

US 2008/0225794 A1    Sep. 18, 2008

(30) Foreign Application Priority Data

Dec. 22, 2006    (FR) ...................................... 06 55928

(51) Int. Cl.
*H04W 4/00* (2009.01)
(52) U.S. Cl.
USPC ............ 370/331; 370/332; 455/436; 455/444
(58) Field of Classification Search
USPC ......... 370/321, 322, 324, 331, 334, 335, 336, 370/337, 433, 443, 439, 341, 326, 350, 370/503; 455/443, 444, 438, 439, 440, 441, 455/436
See application file for complete search history.

(56) References Cited

U.S. PATENT DOCUMENTS

| | | | | |
|---|---|---|---|---|
| 6,414,947 | B1 * | 7/2002 | Legg et al. ..................... | 370/331 |
| 6,707,808 | B1 * | 3/2004 | Vedrine ......................... | 370/337 |
| 6,804,212 | B1 * | 10/2004 | Vallstrom et al. .............. | 370/331 |
| 7,447,169 | B2 | 11/2008 | Okamoto et al. | |
| 2001/0015964 | A1 | 8/2001 | Fuchisawa | |
| 2002/0102985 | A1 * | 8/2002 | Amalfitano et al. .......... | 455/453 |
| 2005/0124344 | A1 | 6/2005 | Laroia et al. | |
| 2005/0272426 | A1 * | 12/2005 | Yang et al. .................... | 455/436 |
| 2009/0103494 | A1 * | 4/2009 | Ma et al. ....................... | 370/331 |

FOREIGN PATENT DOCUMENTS

| | | |
|---|---|---|
| JP | 8340569 | 12/1996 |
| JP | 2001231062 | 8/2001 |
| JP | 2003264876 | 9/2003 |

OTHER PUBLICATIONS

Search report dated Jul. 8, 2007.

* cited by examiner

*Primary Examiner* — Dady Chery
(74) *Attorney, Agent, or Firm* — Tutunjian & Bitetto, P.C.

(57) ABSTRACT

In order to prevent breaks in a communication network comprising at least one subscriber station and at least two base stations synchronised and connected to each other by a communication link, a method is provided comprising a time resource allocation step for the transmission and/or reception of packets by the at least one subscriber station, the time resource being specific to each subscriber station and being able to be used with all the base stations.

14 Claims, 10 Drawing Sheets

Figure 1:
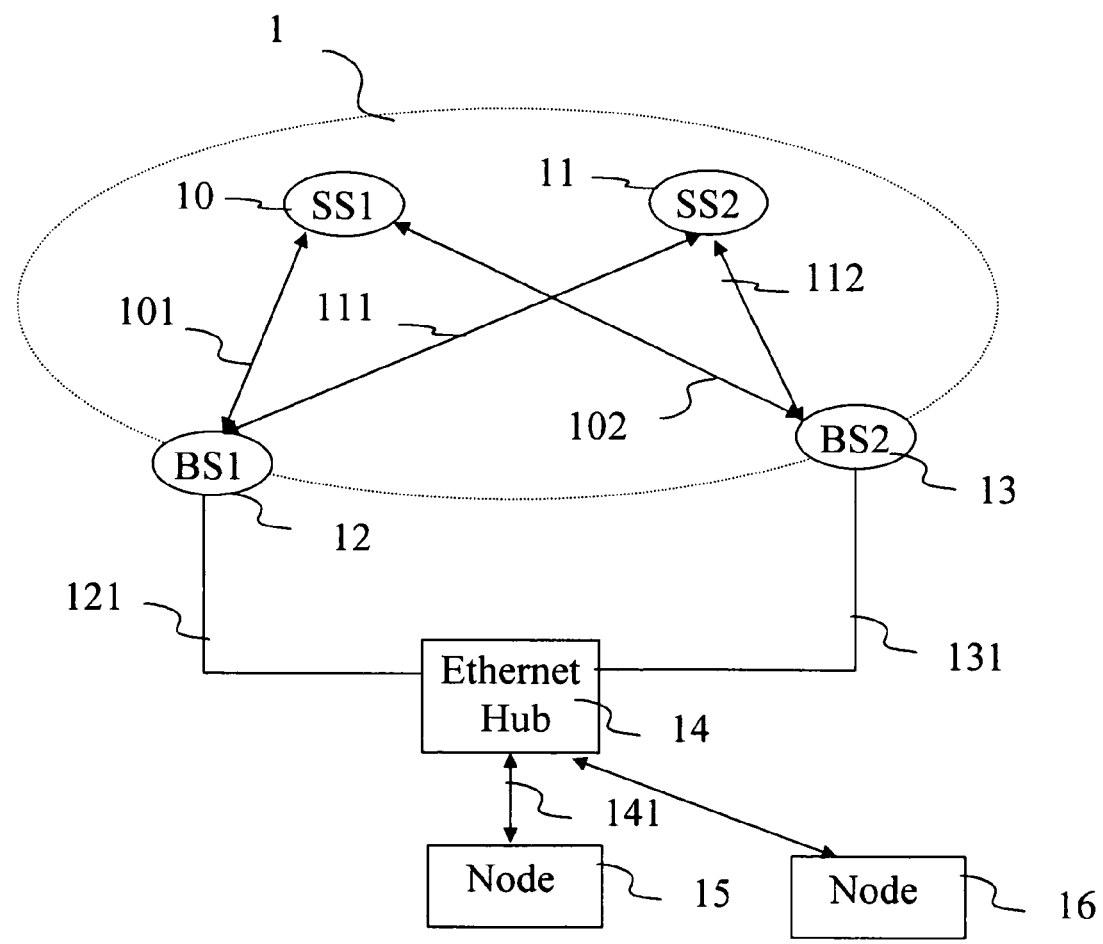

COMMUNICATION METHOD BETWEEN AT LEAST ONE SUBSCRIBER STATION AND AT LEAST TWO BASE STATIONS

This application claims the benefit, under 35 U.S.C. §119, of European Patent Application No. 0655928 on 22 Dec. 2006.

1. SCOPE OF THE INVENTION

The present invention relates to the wireless telecommunications field and more specifically to the passing of a communication associated with a mobile station from one relay station to another (known as handover).

2. TECHNOLOGICAL BACKGROUND

According to the prior art, several wireless network architectures are known. Some of them are based on a centralised architecture. Hence, the Wi-fi system (based on the IEEE 802.11a standard) has a non-centralised architecture with a contention channel access. Such an architecture does not enable Quality of Service (or QoS) to be managed effectively enough for some applications. The Wimax system (based on the IEEE 802.16 standard) has a centralised architecture that allows a more suitable quality of service to be implemented for some applications.

Nevertheless, the techniques implemented in the Wimax networks do not enable a quality of service to be guaranteed for all the applications, for example for video type communications, data being transmitted by wireless cameras moving around in noisy radio-frequency environments, subject to interference or disturbed by obstacles creating signal losses or echoes. Hence, a communication with a wireless station can be cut off suddenly (for example, when the mobile station is moving around).

3. SUMMARY OF THE INVENTION

The purpose of the invention is to overcome the disadvantages of the prior art.

More particularly, the purpose of the invention is to enable the transmission and/or reception of data by at least one wireless station intended for or coming from relay stations, with a guaranteed quality of service and more specifically with an absence of cutting off of the communication (namely, with no loss of packets sent or having to be received by the wireless station or stations) under normal conditions of use.

For this purpose, the invention proposes a communication method implementing at least one subscriber station and at least two base stations synchronised and connected to each other by a communication link. In order to enable a transmission over the communication channel without any cut off, the method comprises a time resource allocation step for the transmission and/or reception of packets by at least one subscriber station, the said time resource being specific to each subscriber station and being able to be used with all the base stations.

According to one advantageous characteristic, for each of the stations in a set comprising at least one part of the subscriber station or stations, the method comprises the following steps:

connection of the subscriber station to a first base station, the base station emitting and/or receiving data intended for and/or coming from the subscriber station, handover decision of the connection of the first base station to a second base station, the decision being made by the subscriber station, connection of the subscriber station to a second base station, the base station emitting and/or receiving data intended for and/or coming from the subscriber station.

The method comprises the steps above for a set that comprises a part of the subscriber stations (for example, a single station or a few subscriber stations) and all the subscriber stations. The handover decision being made by the subscriber station concerned, the handover is made advantageously according to criteria specific to the subscriber station (for example, reception quality of the signals sent by each base station, this quality being able to comprise the reception level and/or the error rate after decoding). The connection of a subscriber station to a base station means that the subscriber station can transmit data to this base station, receive data from this base station or both send and receive data intended for and coming from this base station.

Advantageously, during a handover phase, the first and second base stations share the same time resource to send and/or receive data intended for and/or coming from the said subscriber station.

The time resource corresponds to a time slot in a given frequency band. The frequency band can be use both for the upward and downward direction, or, on the contrary, two separate frequency bands are used for the upward direction and the downward direction. The time resource is assigned either to one of the directions or to both directions.

According to a particular characteristic, the first base station transmits data intended for the subscriber station and recorded before the start of the handover phase.

According to another particular characteristic, the second base station transmits data intended for the subscriber station and recorded after the start of the handover phase.

Advantageously, the method comprises a transmission step of data representative of the start of the handover phase.

According to an advantageous characteristic, the method comprises a radio packet transmission step indicating the time slot used for the time resource.

According to a particular characteristic, the method comprises an assignment step of a connection identifier associated with each subscriber station.

The connection identifier is advantageously representative of the base station with which the subscriber station communicates and/or the direction of communication with the subscriber station.

4. LIST OF FIGURES

Figure 2:
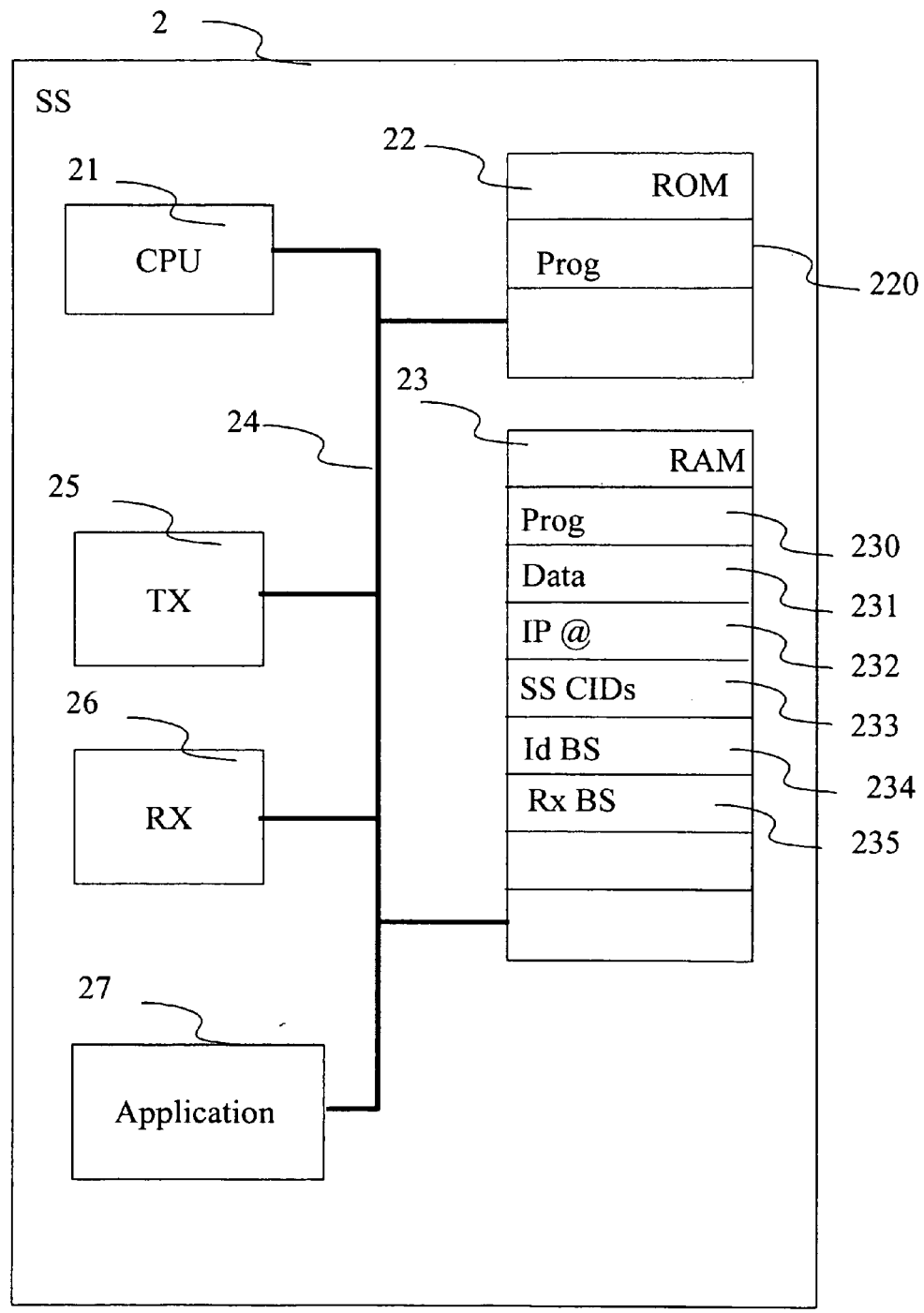
Figure 3:
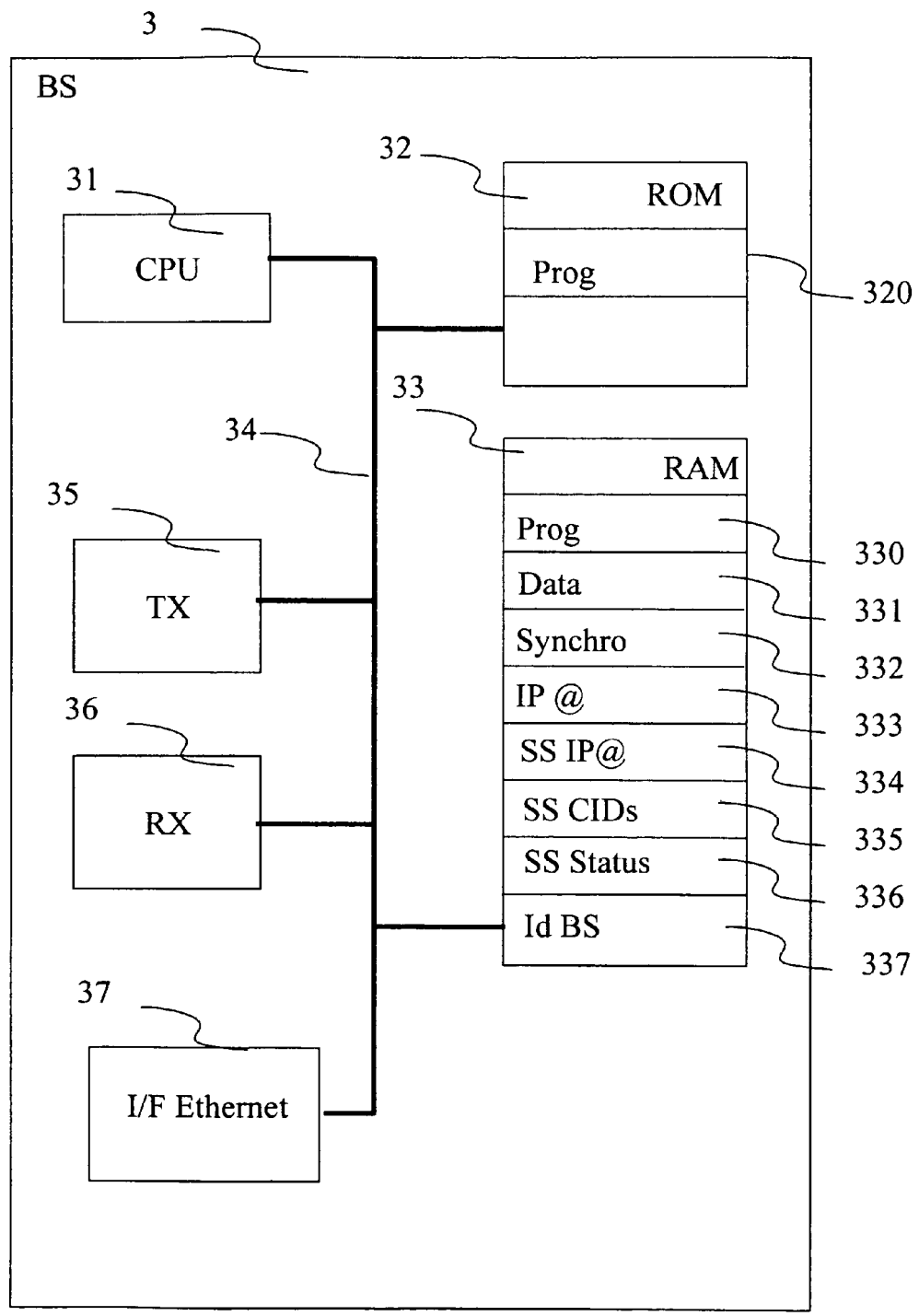
Figure 4:
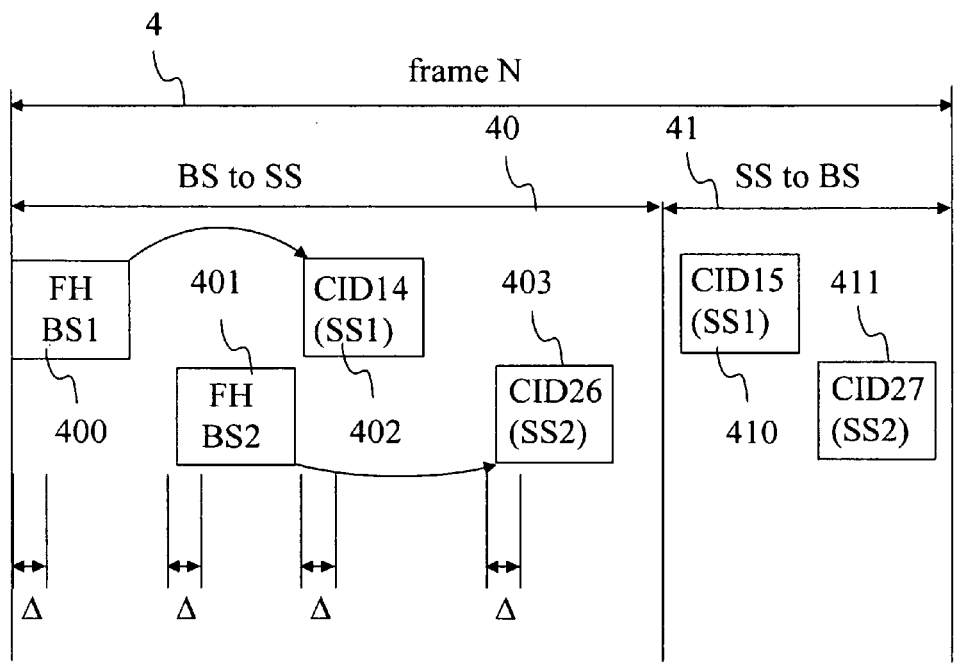
Figure 5:
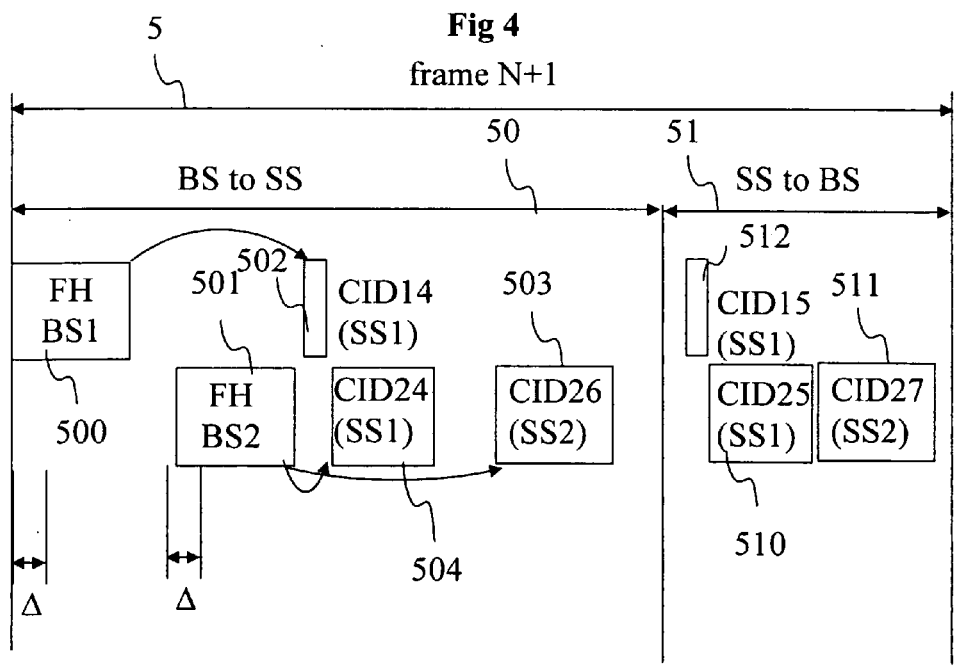
Figure 6:
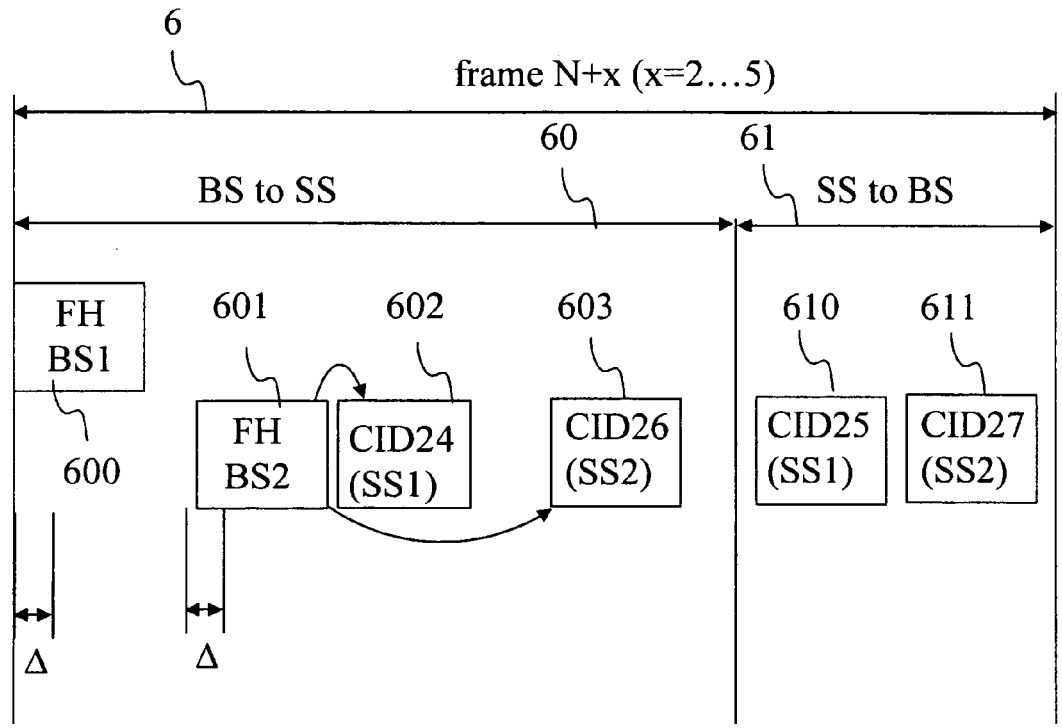
Figure 7:
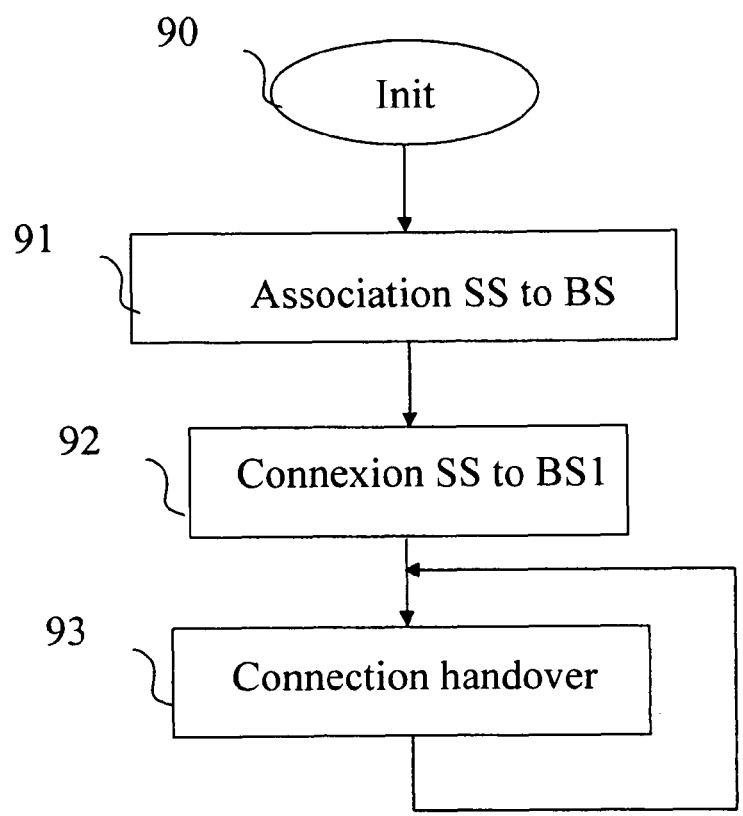
Figure 8:
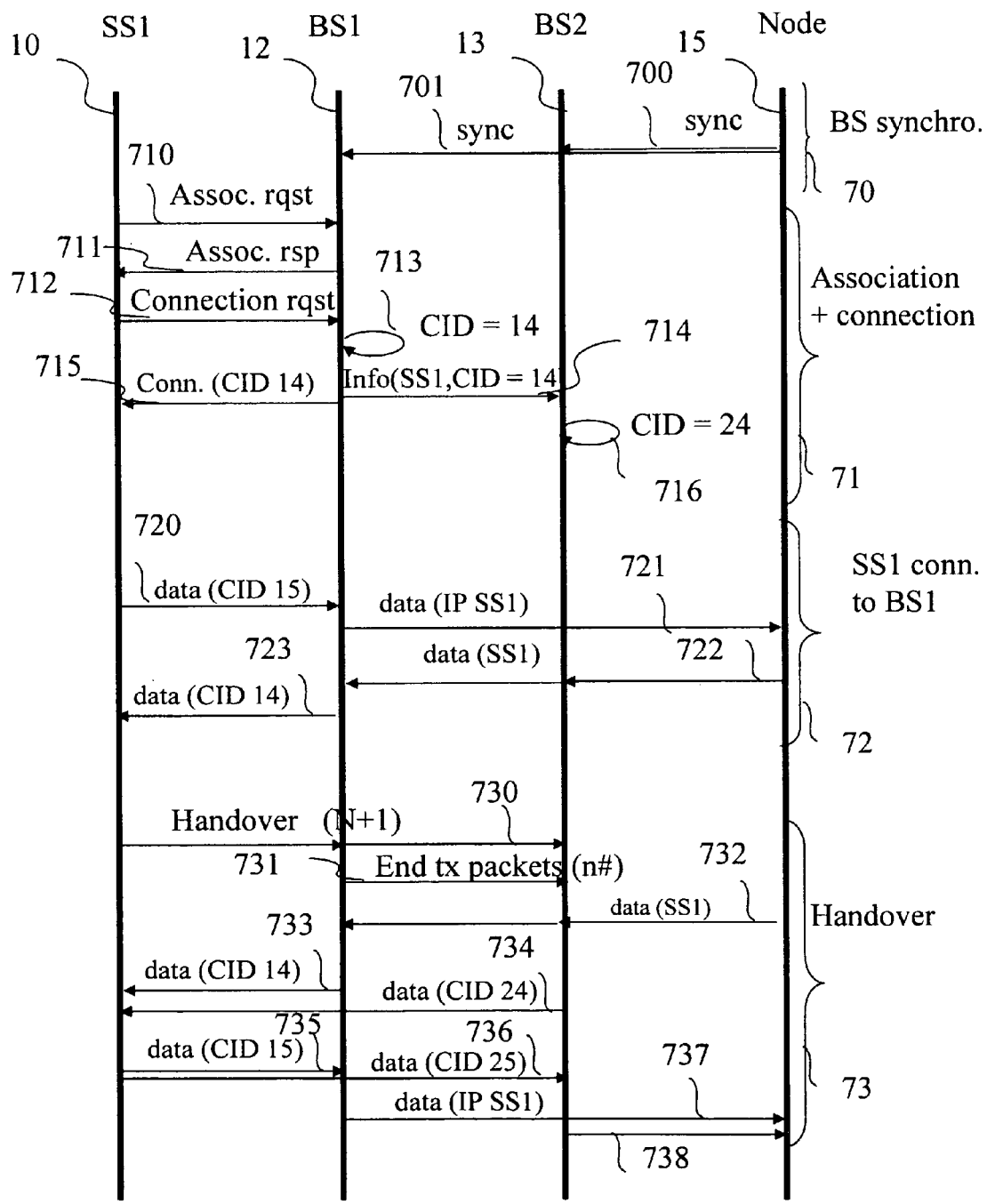
Figure 9:
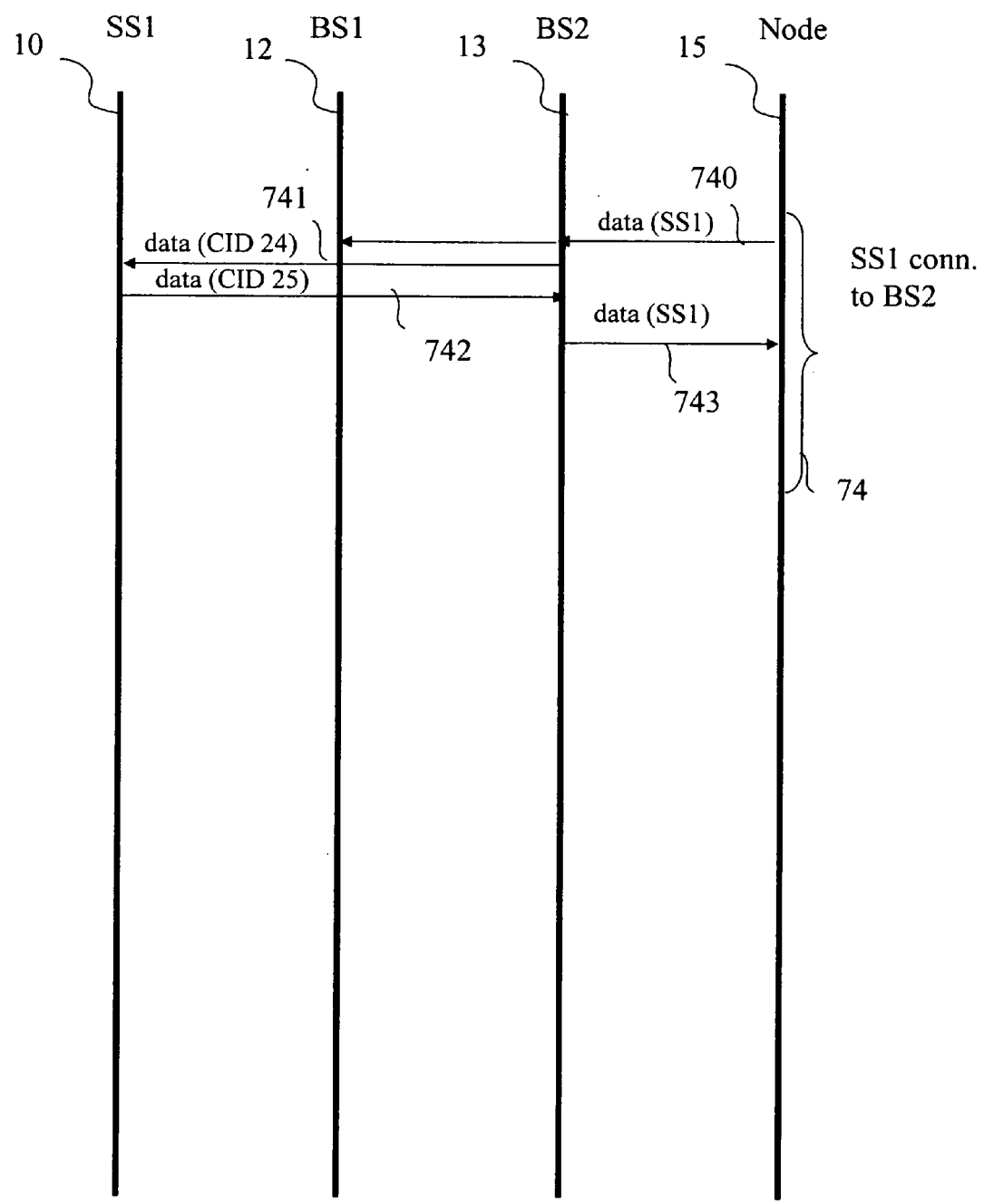
Figure 10:
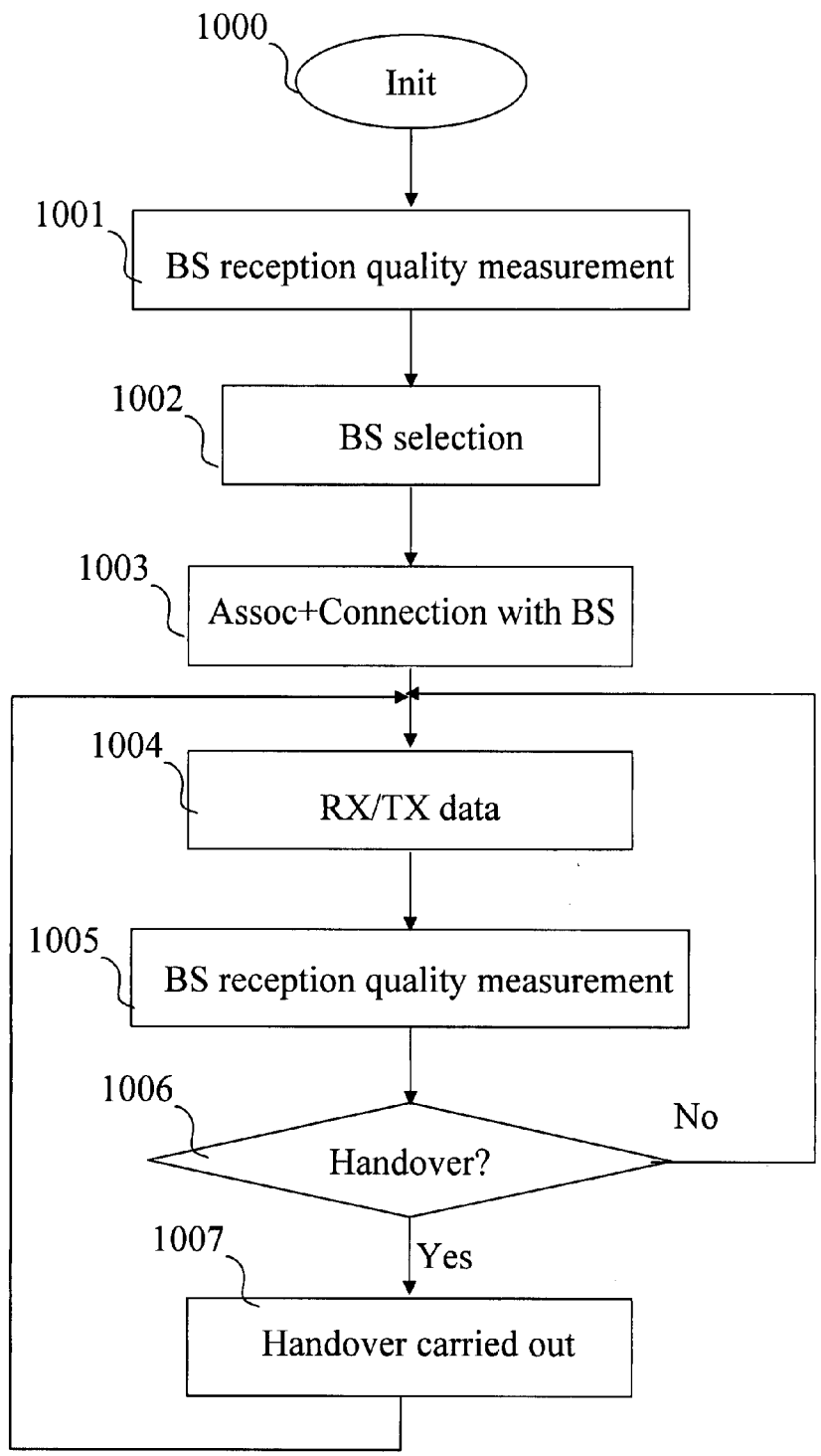
Figure 11:
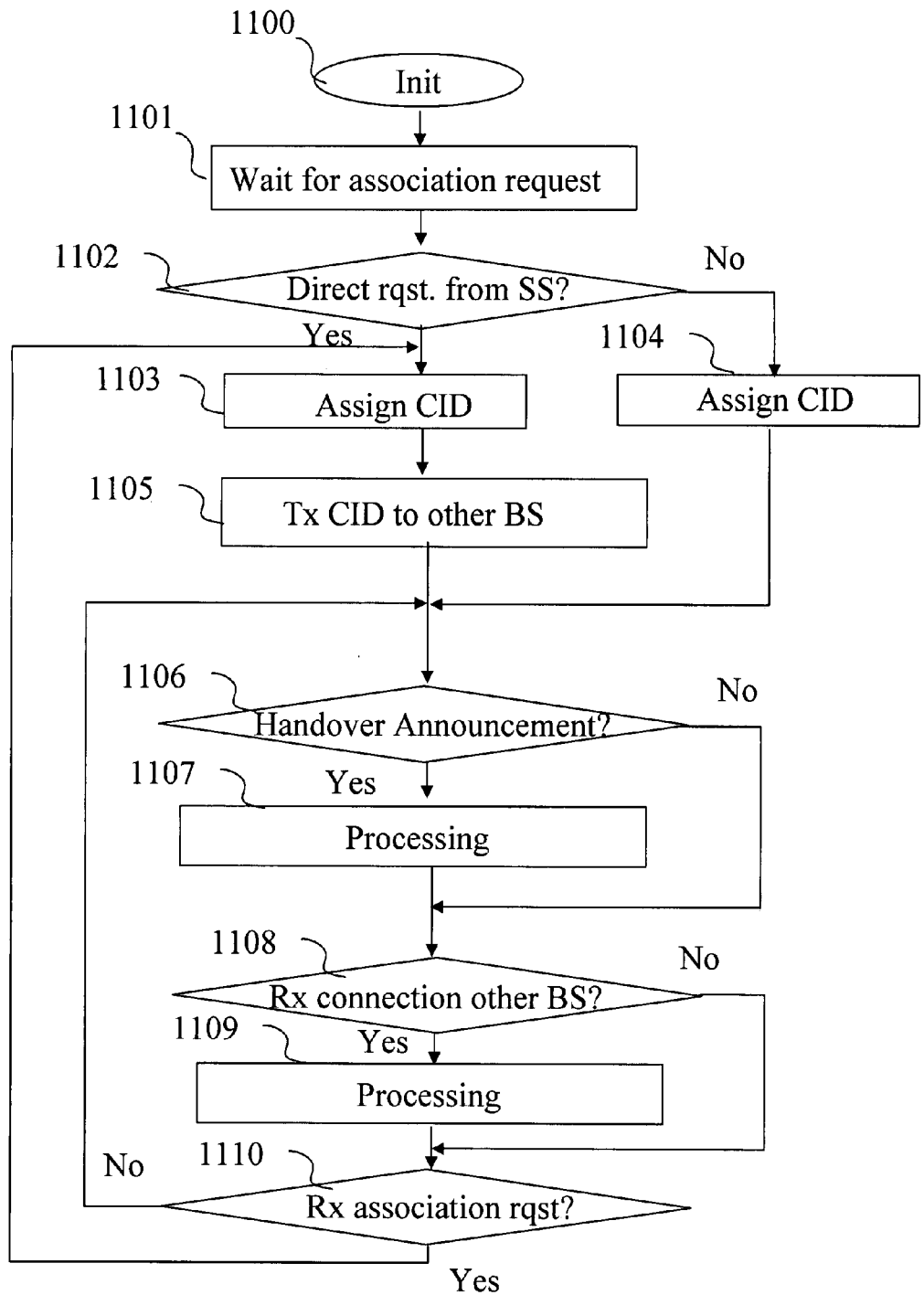

The invention will be better understood, and other specific features and advantages will emerge from reading the following description, the description making reference to the annexed drawings wherein:

FIG. 1 illustrates an example of a communication network architecture with elements implementing the invention, FIGS. 2 and 3 diagrammatically show, respectively, a mobile wireless station and a relay station belonging to the network of FIG. 1, according to a particular embodiment of the invention, FIGS. 4 to 6 show examples of exchanges of radio frames between a wireless station and a relay station belonging to the network of FIG. 1, FIG. 7 shows a method used in the network of FIG. 1, according to a particular embodiment of the invention, FIGS. 8 and 9 illustrate an example of communication between different elements of the network of FIG. 1, and FIGS. 10 and 11 show a method of communication used respectively in a mobile wireless station and in a relay station belonging to the network of FIG. 1.

5. DETAILED DESCRIPTION OF THE INVENTION

FIG. 1 shows a communication network comprising a wireless network 1 and a wired Ethernet network.

The wireless network 1 comprises one or more wireless stations, fixed or, advantageously mobile. The wireless stations are for example two mobile stations (MS) or subscriber stations SS1 10 and SS2 11.

The Ethernet comprises a hub 14 and two nodes 15 and 16 connected to each other by an Ethernet link.

Stations 10 and 11 can transmit or receive data intended for or coming from the node 15 via relay stations or base stations (BS) BS1 12 and BS2 13. The base stations 12 and 13 enable the interface between the wireless network 1 and the Internet network to be provided. Hence, the base station 12 (respectively 13) is connected via a bidirectional wireless link 101 (respectively 102) to the station MS1 10 and 111 (respectively 112) to the link MS2 11. The network architecture 1 is such that the network 1 comprises enough base stations to cover the entire zone in which the mobile stations are likely to be found. Hence, at any time, each mobile station of the network 1 is connected to at least one base station of the network 1 by a wireless link enabling a wireless communication to be provided. The base stations 12 and 13 are connected to the hub 14 via an Ethernet link respectively 121 and 131. Hence, for example, if the station SS1 is connected to the station BS1, the station SS1 can transmit data to the node 15 via the links 101, 121 and 141. One of the nodes 15 and 16 can be dedicated to the synchronisation of the base stations and regularly broadcast a synchronisation signal intended for the base stations.

The stations SS1 and SS2 are for example mobile cameras, equipped with wireless communications means and the node 15 an image processing system (for example, a video recorder, a studio entry point, etc.). Hence, the network of FIG. 1 enables a continuous transmission (namely uninterrupted) of the videos transmitted by the cameras to the processing system).

Advantageously, the base stations share a same radio frequency channel, the radio spectrum being a resource to economise. The base stations can possibly listen mutually to each other on the radio channel. According to one embodiment, the base stations cannot listen mutually to each other on the radio channel.

Advantageously, the communications used between the nodes of the network of the FIG. 1 are of the IP type (Internet Protocol), the SS, BS and the node 15 each having an IP address. IP is used to transport the flow in streaming mode, for example for transporting video and/or audio in unidirectional or bidirectional mode.

FIG. 2 diagrammatically shows a mobile station 2 of the network 1 corresponding to SS1 or SS2.

The mobile station 2 comprises, connected to each other by an address and data bus 24, also transporting a clock signal:
 a microprocessor 21 (or CPU),
 a non-volatile memory of the ROM type (Read Only Memory) 22,
 a Random Access Memory or RAM 23,
 a transmission module 25 of a signal on the wireless link,
 a reception module 26 of a signal on the wireless link, and
 an interface 27 to an application.

Moreover, each of the elements 21 to 26 is well known by a person skilled in the art. These common elements are not described here.

It is noted that the word "register" used in the description of the memories 22 and 23 designates in each of the memories mentioned, a memory zone of low capacity (some binary data) as well as a memory zone of large capacity (enabling a whole programme to be stored or all or part of the data representing an audio/video service received).

The application is, for example, of the video type and constitutes respectively the source and destination of the data respectively transmitted and received by the mobile station 2 (the mobile station 2 is for example a camera).

The ROM memory 22 notably comprises a "prog" programme 220.

The algorithms implementing the steps of the method specific to the invention and described below are stored in the memory ROM 22 associated with the mobile station 2 implementing these steps. When powered up, the microprocessor 21 loads and runs the instructions of these algorithms.

The random access memory 23 notably comprises:
 in a register 230, the operating programme of the microprocessor 21 responsible for switching on the mobile station 2,
 data or PDUs containing this data in a register 231,
 an IP address of the mobile station 2 in a register 232,
 connection identifiers or CID in a register 233,
 BS identifiers of the network 1, an identifier comprising the IP or Ethernet MAC address in a register 234, and
 information relating to the quality of reception of the frame and/or packet header transmitted by each BS in a register 235.

FIG. 3 diagrammatically shows a base station 3 of the network 1 corresponding to BS1 or BS2.

The base station 3 comprises, connected to each other by an address and data bus 34, also transporting a clock signal:
 a microprocessor 31 (or CPU),
 a non-volatile memory of the ROM type (Read Only Memory) 32,
 a Random Access Memory or RAM 33,
 a transmission module 35 of a signal on the wireless link,
 a reception module 36 of a signal on the wireless link, and
 an interface 37 to an Ethernet network.

Moreover, each of the elements 21 to 26 is well known by a person skilled in the art. These common elements are not described here.

It is noted that the word "register" used in the description of the memories 32 and 33 designates in each of the memories mentioned, a memory zone of low capacity (some binary data) as well as a memory zone of large capacity (enabling a whole programme to be stored or all or part of the data representing an audio/video service received).

The ROM memory 32 notably comprises a "prog" programme 320.

The algorithms implementing the steps of the method specific to the invention and described below are stored in the memory ROM 32 associated with the base station 3 implementing these steps. When powered up, the microprocessor 31 loads and runs the instructions of these algorithms.

The random access memory 33 notably comprises:
 in a register 330, the operating programme of the microprocessor 31 responsible for switching on the base station 3,
 data or PDUs containing this data in a register 331,
 data associated with the synchronisation of the base station 3 in a register 332,
 an IP address of the base station 2 in a register 333, IP addresses of mobile stations of the network 1 in a register 334, connection identifiers or CID in a register 335, mobile station statuses (for example, associated or connected to the station 3 or to another station in a register 336, and identifiers of the other BS or other BSs connected to the BS 3 (via for example an Ethernet link), an identifier comprising the IP or Ethernet MAC address in a register 337.

FIGS. 8 and 9 illustrate an example of communication between the mobile station 10, the base stations 12 and 13 and the node 15 (these elements are represented by vertical lines; actions, events and/or successive transmissions are chronologically illustrated).

During step 10, the node 15 transmits synchronisation signals 700 and 701 to each of the base stations 12 and 13. To illustrate this, it is the same node 15 that enables the synchronisation of the base stations and that receives or transmits the data coming from or intended for the mobile station 10. According to one variant, it is the node 16 that enables the synchronisation. Moreover, the signals 700 and 701 are advantageously combined into a single signal (broadcast signal).

The different base stations are synchronised with a precision slot Δ compatible with the size of the frames. Δ is advantageously less than 500 μs and even more advantageously less than 50 μs.

Several synchronisation mean can be considered:

a synchronisation via the Ethernet network (as illustrated in FIG. 8) according, for example, to an IEEE1588 protocol PTP (Precision time protocol) that enables a precision in the order of 1 μs, a synchronisation via a radio transmission controlled by an atomic clock, a clock being locked onto a radio transmission over a wide geographic coverage (for example a country). It may be the radio clock transmitter of Anthorn in the United Kingdom at 60 kHz, the radio clock of Mainflingen in Germany at 77 kHz or Fort Collins in the USA at 60 kHz, a synchronization via an Ethernet/IP network according to an IP based protocol based on NTP which can supply a time base with a precision in the order of a few hundred microseconds.

For the synchronization with the other base stations, each base station receives a signalling signal to generate a start pulse for each radio frame carrying a same number and transiting on the wireless network 1. Hence, each base station can emit its own frame in a slot allocated in a synchronized manner with the others. A single base station emits at a given moment, the transactions not intersecting.

This is illustrated by FIG. 4 that chronologically describes the emission and reception of a frame 4 numbered N. The frame 4 is divided into two slots 40 and 41 corresponding respectively to the downward direction, base station to mobile station and to the upward direction, mobile station to base station.

The slot 40 comprises:

one part reserved for frame headers in the time slots assigned to each BS, one part reserved for the transmission of data to the mobile station or stations connected in the time slots assigned to each BS, and a part (not shown) enabling exchanges in contention mode (notably to enable mobile stations not associated or not connected to do it).

In the first part of the slot 40, the station BS1 first emits a frame header or FH 400. Next, the station BS2 emits a frame header or FH 401. The start of the header emission 400 (respectively 401) corresponds to the start of a slot allotted to BS1 (respectively BS2) with the precision A. Each FH comprises the time mapping of resource allocations by connection in the current frame. The assignment of slots for the FHs is unremarkable (for example determined according to the MAC address of the BSs or to the order of declaration in the network). When an MS is associated with the BS, the BS receiving the association request (or by another BS (for example a BS according to a variant)) allocates in a non-equivocal manner time resources for the transmission and/or reception of data packets. A time resource is assigned to a single MS (for example, if a single BS allocates the resources or if an allocation mechanism shared between several BSs prevents two separate MSs from being allocated a same time resource).

A CID is associated with each upward or downward connection between an MS and a BS. Hence, each CID identifies precisely a connection between an MS and a BS as well as the downward or upward direction (two separate connections therefore have a different CID). According to one variant, the CID is the same for the upward and downward direction. When a mobile station is associated with a base station, it is automatically associated with the other base stations. Advantageously, the other base stations deduce from the first CID allocated for an association operation, according to a predefined law, the CIDs associated with the connection with themselves of the mobile station concerned and for each communication direction. According to one variant, the first base station attributing a CID also attributes the CIDs for the connections of the relevant mobile station with the other base stations. According to another variant, each base station and mobile station can deduce the CIDs from the first CID attributed. The predefined law is based for example on parts of the CID identifying respectively the base station, the mobile station, the direction and, possibly, a particular association (if particularly several connections concern for a given direction a same mobile station and a same base station). As an illustration, for SS1, a CID is equal to:

14 for a BS1 connection to SS1, 15 for an SS1 connection to BS1, 24 for a BS2 connection to SS1, and 25 for an SS1 connection to BS2, Hence, if CID is noted in hexadecimal mode, the first quartet is associated with a BS (here 1 for BS1 and 2 for BS2) and the first three bits of the second quartet are associated with the SS (here 4) and the last bit is associated with the direction (1 for SS to BS and 0 for BS to SS). Advantageously, all the base stations and all the mobile stations know the CID assignment law according to a first CID and can therefore effectively manage (for the listening and the transmission of messages with specific CIDs as well as for creation) the CIDs (this is the role of the classifier).

It is assumed that during frame 4, SS1 (respectively SS2) exchanges data with BS1 (respectively BS2). Hence, in the part reserved for the transmission of data from BSs to SSs, BS1 first transmits to SS1 in a slot 402 assigned to the connection with SS1, data with the CID 14. Then, BS2 transmits to SS2 in a slot 403 assigned to the connection with SS2, data with the CID 26.

The slot 41 comprises a part reserved for the transmission of data by the mobile station or stations connected in polling mode, time slots being assigned to each MS. Hence, in slot 41, SS1 first transmits to BS1 in a slot 410 assigned to the connection with SS1, data with the CID 15. Then, SS2 transmits to BS2 in a slot 411 assigned to the connection with SS2, data with the CID 27.

When each BS is synchronised, it is synchronised again regularly (for example every second) or each time that it is necessary.

After the synchronisation phase 70, FIG. 8 illustrates an association and connection phase 71.

As an illustration, this phase begins with the transmission of an association request 710 by SS1 to BS1. This message is transmitted during the contention period in the slot 40. During one of the frames that follow, BS1 sends a frame header comprising a message 711 of a response type for the association. The format of the messages 710 and 711 is for example such as defined according to the standard IEEE 802.16.

Then, the SS1 having chosen BS1 as base station to which it wants to connect, it transmits a connection request 711 to BS1 during the contention period. According to one variant, BS1 consults SS1 in polling mode to enable SS1 to emit, for example, a connection request 711.

Then, BS1 determines a CID during a step 713: a CID worth 14 is associated with the connection of BS1 to SS1. BS1 then transmits an information message 714 to BS2, this message containing the parameters of the connection, notably with the CID. BS2 thus determines a CID during a step 716 according to the message 714: a CID worth 24 is associated with the connection of BS2 to SS1. After the step 713, BS1 also transmits a connection message 715 to SS1 with the identifier corresponding to CID worth 14. SS1 can then record this value and from it deduce the value of the CID corresponding to the BS2 connection to SS1 or to the connections SS1 to BS1 and SS1 to BS2. According to a variant of the invention, the CIDs corresponding to the different connections are explicitly requested from the BSs via similar messages to the message 712.

After the phase, SS1 is linked to BS1 and can receive or transmit data. Hence, SS1 transmits during the slot 15 a message 720 associated with the CID worth 24 and containing data with a destination address corresponding to the IP address of the node 15. BS1 then transmits to node 15 the content of the message 720 to the node 15 via the link 121. The node 15 transmits via the link 141 a message 722 received by BS1 and BS2 and whose destination address is the IP address of SS1. BS1 being connected to SS1, BS1 transmits the content of the message 722 to SS1 during one or more slots 402 with a CID worth 14.

After the phase 72, SS1 requests a connection handover from BS1 to BS2 during a phase 73.

Phase 73 is illustrated by FIG. 5 that chronologically describes the emission and reception of a frame 5 numbered N+1. The frame 5 is divided into two slots 50 and 51 corresponding respectively to the downward direction, base station to mobile station and to the upward direction, mobile station to base station.

The slot 50 comprises parts similar to the parts reserved for the slot 40.

In the first part of the slot 50, the station BS1 first emits a frame header 500. Next, the station BS2 emits a frame header 501.

In the part reserved for the transmission of data from the BSs to the SSs, BS1 first transmits to SS1 in a slot 502 assigned to the connection with SS1, data present in its buffer memories with the CID 14 (this data corresponding, for example, to packets or parts awaiting positive acknowledgment, a negative acknowledgement having previously been received or no positive acknowledgement having previously been received). Then, BS2 transmits to SS1 in a slot 504 assigned to the connection with SS1, with the CID 24 of data coming from the node 15. The slot 402 encompasses the slots 502 and 504. The slots 502 and 504 do not intersect. The slot 502 is advantageously smaller than 504 (the duration of 502 is, for example, less than $\frac{1}{10}^{th}$ of the time of 504, or even less, the buffer memories of BS1 generally containing little amounts of data). The sharing of the slot 402 in slots 502 and 504 follows a determinist diagram (for example a fixed ratio for the connection with the old BS during a predetermined number of frames or even according to an exchange protocol between the BS concerned or with an arbitrating BS This sharing can also take into account the quantity of data in the buffer memories to empty. Next, BS2 transmits to SS2 in a slot 503 assigned to the connection with SS2, data with the CID 26 coming from the node 15.

The interval 51 comprises a part reserved for the transmission of data by the mobile station or stations connected in polling mode, time slots being assigned to each MS. Hence, in the slot 51, SS1 first transmits to BS1 in a slot 512, the data present in its buffer memories with the CID 15 (for example data awaiting acknowledgement) then in a slot 510 of new data destined for node 15 to BS2. Then, SS2 transmits to BS2 in a slot 51 assigned to the connection with SS2, data with the CID 27. The slot 412 encompasses the slots 512 and 510. The slots 510 and 512 do not intersect. The slot 512 is advantageously smaller than 510 (the duration of 512 is, for example, less than $\frac{1}{10}^{th}$ of the time of 510, or even less, the buffer memories of SS1 generally containing little amounts of data destined for BS1 after the start of the handover). The sharing of the slot 412 in slots 512 and 510 follows a determinist diagram (for example a fixed ratio for the connection with the old BS during a predetermined number of frames or even according to an exchange protocol between the BS concerned or with an arbitrating BS This sharing can also take into account the quantity of data in the buffer memories to empty.

Phase 73 is initiated by the transmission of a specific message 730 from SS1 to BS1 and BS2, this message indicating the frame number from which the handover is effective (here the number N+1, the specific message 730 being transmitted for example 10 frames beforehand).

BS1 thus transmits a message 731 to BS2 to inform it of the number (for example number of an IP frame) of the last packet that BS1 is responsible for transmitting to SS1. BS2 will transmit the following packets to SS1. The message 731 marks the start of the handover phase from which the data reaching BS1 and BS2, are no longer recorded by BS1 but by BS2. During the handover phase, BS1 empties its buffer memory by transmitting the data to SS1, whereas BS2 begins to send the data to SS1. BS1 and BS2 share the time resource allocated to SS1 for each direction.

The node 15 transmits via the link 141 a message 732 received by BS1 and BS2 and whose destination address is the IP address of SS1. When the handover is made, BS1 empties its buffer memory by transmitting to SS1 the data corresponding to the messages 733 (associated with the slot 502) corresponding to CID worth 14 whereas BS2 transmits the data transmitted by the node 15 in messages 734 corresponding to CID worth 24 (in the slot 504).

SS1 transmits during the slot 512 a message 735 associated with the CID worth 15 and containing data present in its buffer memories before the handover and with a destination address corresponding to the IP address of the node 15. Then, SS1 transmits during the slot 510 a message 736 associated with the CID worth 25 and containing data generated after the handover and with a destination address corresponding to the IP address of the node 15. BS1 and BS2 thus transmit the data received from SS1 to the node 15 in the messages respectively 737 and 738.

After the handover phase 73, SS1 is linked to BS2 and can receive or transmit data via BS2 in a phase 74 illustrated in FIG. 9.

FIG. 6 chronologically described the emission and reception of a frame 4 numbered N+x (where x is worth for example 2 to 5). Frame 4 is divided into two slots 60 and 61 corresponding respectively to the downward and upward direction.

The slot 60 comprises the headers 600 and 601 similar to the headers respectively 400 and 401. The slot 402 is replaced by a slot 602 assigned to the connection between BS2 and SS1 with a CID worth 24. The slot 600 also comprises a slot 603 similar to the slot 403.

In the slot 61, SS1 first transmits to BS2 in a slot 610 assigned to the connection with SS1, data with the CID 25. Then, SS2 transmits to BS2 in a slot 611 assigned to the connection with SS2, data with the CID 27.

As shown in FIG. 9, SS1 transmits during the slot 610 a message 742 associated with the CID worth 25 and containing data with a destination address corresponding to the IP address of the node 15. BS1 then transmits to the node 15 the content of the message 742 to the node 15 via the link 121. The node 15 transmits via the link 141 a message 740 received by BS1 and BS2 and whose destination address is the IP address of SS1. BS1 being connected to SS1, BS2 transmits the content of the message 740 to SS1 during one or more slots 602 with a CID worth 24.

FIG. 7 summarises the handover processing method. This method begins with an initialisation phase 90 during which the different parameters of the network are updated.

Then during a step 91, each SS of the network 1 is associated with a BS.

Next, during a step 92, each SS of the network 1 is connected to a BS.

Next, during step 93, each SS manages its connections to the BSs by choosing the BS to which it wants to be connected and by handing over to another BS than the one to which it is connected when a change is required.

FIG. 10 illustrates the management of the communication between the BSs, as implemented in SS1.

This management begins with an initialisation phase 1000 during which the SS2 initialises the different parameters and useful variables.

Then, during a step 1001, SS1 measures the level or the quality of reception of the FHs sent by each of the BSs. Each BS indeed emits FHs even if no SS is connected.

Then, during a step 1002, SS1 selects the BS that corresponds to the best reception.

Next, during a step 1003, SS1 is associated and connects to a BS as illustrated in FIG. 8.

Then, during a step 1004, SS1 receives data (transmitted by a BS) that the CPU sends to the application and transmits data generated by the application to the BS to which it is connected.

Next, during a step 1005 similar to step 1001, SS1 assesses the level or the quality of reception of the FHs sent by each of the BSs.

Then, during a test 1006, SS1 checks whether or not a handover to another BS is necessary.

In the affirmative case, during a step 1007, SS1 carries out a handover operation to the BS determined during the test 1006.

After the step 1007 or if the result of the test 1006 is negative, the step 1004 is reiterated.

FIG. 11 illustrates the management of the connections with the SSs, as implemented in each BS.

This management begins with an initialisation phase 1100 during which the BS initialises the different parameters and useful variables.

Then, during a step 1101, the BS waits then receives association and connection requests.

Next, during a test 1102, the BS checks whether the association and connection requests are derived directly from a SS.

In the affirmative, during a step 1103, after receiving a connection request from the SS having requested the association, the BS assigns a CID to the accepted connection. Then, during a step 1105, the BS transmits via an Ethernet link the CID corresponding to the connection.

If the result of the test 1102 is negative, an information sent by another BS and indicating a connection between a SS and this other BS is received. The BS thus assigns, during a step 1104 a CID according to the CID associated with the connection with the other BS.

Next, during a test 1106, the BS checks whether a handover announcement is received. In the affirmative case, during a step 1107, the BS processes this handover by determining the packet from which the handover will be effective and the BS to which the handover is made is informed of this.

After step 1107 or if the result of the test 1106 is negative, during a test 1108, the BS checks whether a connection announcement transmitted by another BS is received. In the affirmative case, during a step 1109, the BS assigns a CID according to the CID associated with the connection with the other BS.

After the step 1107 or if the result of the test 1108 is negative, the BS verifies whether association and connection requests coming from an SS are received.

In the negative case, the test 1106 is repeated. In the affirmative case, the step 1103 is repeated.

Naturally, the invention is not limited to the embodiments previously described.

In particular, the architecture of the mobile stations and base stations can be different from the architectures illustrated in FIGS. 2 and 3, in the respective function and/or form of the elements (the functions of the electronic elements can notably be grouped into a restricted number of components or, on the contrary, expanded into several components) and their layout.

The invention is not limited to an architecture as described with respect to FIG. 1 but involves any architecture implementing a wireless network with local (for example a few tens of meters) or remote (for example a few kilometers according notably to a standard IEEE 802.16) coverage with one or more SS, each SS being connected at any time to at least one BS. According to one variant, the link between the BSs and/or between the BSs and the destination and/or source node is a wireless link (local or remote link).

The invention can also be applied with different communication protocols than those described above. Hence, the control data can be transmitted according to any protocol (for example with a contention access or in polling mode). The communication channels between the SS and the BS can use the same frequency channels for the upward and downward directions (mode known as "half duplex") or different frequency channels (mode known as "full duplex").

The invention claimed is:

1. A communication method implementing at least one subscriber station and at least two base stations synchronised and connected to each other by a communication link, the at least two base stations comprising a first base station and a second base station, the method comprising:

allocating a time resource for the transmission and/or reception of packets by said subscriber station, said time resource being specific to said subscriber station and being usable with all the base stations;

assigning a first connection identifier associated with a connection between the at least one subscriber station and a first base station of the at least two base stations;

assigning a second connection identifier associated with a connection between the at least one subscriber station and a second base station of the at least two base stations, the second base station being different from the first base station and the second connection identifier being determined from the first connection identifier; and handing over a connection from a first base station to a second base station during a handover phase, said first and second base stations sharing said time resource to send and/or receive data intended for and/or coming from said subscriber station.

2. The method according to claim 1, further comprising,:

connecting said subscriber station to the first base station, said first base station emitting and/or receiving data intended for and/or coming from said subscriber station, determining handover of the connection of said first base station to a the second base station, the determination being made by said subscriber station, connecting said subscriber station to said second base station, said second base station emitting and/or receiving data intended for and/or coming from said subscriber station.

3. The method according to claim 2, wherein the first base station transmits data intended for said subscriber station and recorded before the start of the handover phase.

4. The method according to claim 3, wherein said transmission of recorded data takes place during the handover phase.

5. The method according to claim 1, wherein the second base station transmits data intended for said subscriber station and recorded after the start of an handover phase.

6. The method according to claim 5, wherein said transmission of recorded data takes place during the handover phase.

7. The method according to claim 1, further comprising transmitting data representative of the start of an handover phase.

8. The method according to claim 1, wherein said allocating comprises transmitting a radio packet indicating the time slot used for said time resource.

9. The method according to claim 1, wherein said connection identifier is representative of the base station with which the subscriber station communicates.

10. The method according to claim 1, wherein the said a connection identifier is representative of the direction of communication with the subscriber station.

11. The method according to claim 1, wherein said time resource is shared in a first time interval and in a second time interval, the first time interval being associated with the first base station and the second time interval being associated with the second base station.

12. The method according to claim 11, wherein the sharing of said time resource in the first and second time intervals follows a determinist diagram.

13. The method according to claim 11, wherein the sharing of said time resource in the first and second time intervals takes into account the quantity of data to be transmitted by the first base station before the start of the handover phase.

14. The method according to claim 11, wherein the sharing of said time resource in the first and second time intervals takes into account the quantity of data to be transmitted by said subscriber station to the first base station before the start of the handover phase.

* * * * *